United States Patent
Ramly et al.

(10) Patent No.: US 8,892,837 B2
(45) Date of Patent: Nov. 18, 2014

(54) INTEGRATED CIRCUIT WITH TAMPER-DETECTION AND SELF-ERASE MECHANISMS

(75) Inventors: Noor Hazlina Ramly, Sungai Petani (MY); Yin Mei Yap, Seri Kembangan (MY)

(73) Assignee: Altera Corporation, San Jose, CA (US)

( * ) Notice: Subject to any disclaimer, the term of this patent is extended or adjusted under 35 U.S.C. 154(b) by 277 days.

(21) Appl. No.: 13/031,804

(22) Filed: Feb. 22, 2011

(65) Prior Publication Data

US 2012/0216001 A1    Aug. 23, 2012

(51) Int. Cl.
*G06F 12/14*    (2006.01)
*G06F 21/87*    (2013.01)

(52) U.S. Cl.
CPC ........ *G06F 21/87* (2013.01); *G06F 2221/2143* (2013.01)
USPC .... 711/163; 711/164; 711/166; 711/E12.091; 713/194

(58) Field of Classification Search
None
See application file for complete search history.

(56) References Cited

U.S. PATENT DOCUMENTS

| | | | |
|---|---|---|---|
| 7,000,161 B1 | 2/2006 | Allen et al. | |
| 7,117,372 B1 * | 10/2006 | Trimberger et al. | 713/189 |
| 7,368,935 B2 * | 5/2008 | Bernier et al. | 326/8 |
| 7,517,475 B2 | 4/2009 | Lucht et al. | |

* cited by examiner

*Primary Examiner* — Christian P Chace
*Assistant Examiner* — Eric Loonan
(74) *Attorney, Agent, or Firm* — Womble, Carlyle, Sandridge & Rice

(57) ABSTRACT

Methods and apparatuses for improving security of an integrated circuit (IC) are provided. A tamper condition is detected and a digital key stored in the IC is erased. The digital key is associated with a first image loaded onto the IC from a first memory. The memory may be a non-volatile memory module. A second image is loaded into a second memory module. The second memory module may be an embedded memory module, e.g., a control random access memory (CRAM) module. The first image is then erased from the first and second memory modules.

22 Claims, 5 Drawing Sheets

INTEGRATED CIRCUIT WITH TAMPER-DETECTION AND SELF-ERASE MECHANISMS

BACKGROUND

Integrated circuits (ICs) are used in various applications and devices. Generally, in a programmable device, e.g., a field-programmable gate array (FPGA) device, configuration data is stored in a memory module. The memory module may be an embedded non-volatile memory (NVM) module that has the capability to retain the stored data even when the device is not powered. Such a device is programmed or configured with the configuration data from the NVM upon power up, and enters a user mode upon successful configuration.

However, during user mode operation, content stored in the device, e.g., configuration data, can be accessed and copied or reverse engineered by unauthorized individuals. If the stored data can be read from the device, the data can be stored and used in another similar device. For instance, sensitive data can be copied from one device and implemented on another to create a duplicate system. Even encrypted content in programmable device can be readily reverse-engineered once the security key that is associated with the encrypted content is obtained.

Generally speaking, in security-sensitive systems an external controller is used to monitor the system and protect configuration data in the system from being accessed by unauthorized individuals. The external controller is capable of detecting tamper attempts on the system and executing a set of instructions to prevent unwanted access to the content, e.g., configuration data, stored in the system. However, having an external controller takes up valuable real estate on the board and is cumbersome to maintain. In addition, connection issues between the controller and the device may prevent the complete execution of an erase instruction. As a result, sensitive data may not be completely erased in time to prevent unauthorized copying.

SUMMARY

Embodiments of the present invention include circuits and methods for improving security of an integrated circuit (IC) using tamper-detection and/or self-erase mechanisms.

It is appreciated that the present invention can be implemented in numerous ways, such as a process an apparatus, a system, a device or a method on a computer readable medium. Several inventive embodiments of the present invention are described below.

In one embodiment, a method for improving security of an IC is provided. The method includes detecting a tamper condition in the IC. A digital key associated with a first configuration data loaded onto the IC from a first memory is erased. A second configuration data is loaded into a second memory. In one embodiment, the second configuration data replaces the content of the first configuration data with a bit string of zeros. It is appreciated that any bit string may be loaded, e.g., a bit string of ones, a combination of ones and zeros, etc. The first configuration data is erased from the first memory and the second memory. In one embodiment, internal circuitry of the IC controls each method operation.

In another embodiment, a method for operating an IC is provided. The method includes placing the IC in a first operating mode and loading a configuration file into a control random access memory (CRAM) on the IC. The IC is placed in a second operating mode and a tamper-detect signal is received. The tamper-detect signal identifies unauthorized access to the IC. The configuration file is erased from the CRAM on the IC in response to receiving the tamper detect signal. For example, the IC may be placed into the first operating mode and a predetermined configuration is loaded onto the CRAM. A signal for erasing the configuration file from an external memory module is transmitted from the IC.

In another embodiment, an IC is disclosed. The IC includes an input pin coupled to receive a tamper signal and a memory module that stores a configuration image with an associated security key. A user logic block is coupled to receive the tamper signal from the input pin. A core logic block in the IC is coupled to the user logic block and the memory module. The core logic block is operable to transmit configuration instructions through a scan chain interface to overwrite the configuration image and erase the associated security key from the memory module in response to the tamper signal. The IC also includes a clock source that is operable to clock the configuration instructions sent from the core logic block.

In yet another embodiment, a device is provided. The device includes a tamper-detect circuit capable of identifying unauthorized access to the system. An IC is coupled to the tamper-detect circuitry. The tamper-detect circuitry is used to identify unauthorized access to the IC. For example, the tamper-detect circuitry may be a switch or circuit that will send a trigger signal to the IC when it detects an unauthorized attempt to access the device. The IC includes a configuration memory module with a configuration image. A scan chain interface module is coupled to the configuration memory module on the IC. The scan chain interface is operable to send configuration instructions to overwrite the configuration image stored in the configuration memory module based on signals from the tamper-detect circuitry. A non volatile memory module having a copy of the configuration image is coupled to the IC.

Other aspects of the exemplary embodiments will become apparent from the following detailed description, taken in conjunction with the accompanying drawings, illustrating by way of example the principles of the embodiments.

BRIEF DESCRIPTION OF THE DRAWINGS

The exemplary embodiments may best be understood by reference to the following description taken in conjunction with the accompanying drawings.

DETAILED DESCRIPTION

The following embodiments describe circuits and methods for improving security of an integrated circuit (IC) with tamper-detection and self-erase mechanisms.

It will be obvious, however, to one skilled in the art, that the present exemplary embodiments may be practiced without some or all of these specific details. In other instances, well-known operations have not been described in detail in order not to unnecessarily obscure the present embodiments.

The embodiments described herein provide techniques to create an IC device with tamper-detection and self-erase mechanisms in order to protect the device from unauthorized access. The IC device is able to erase both the configuration data or image stored in the IC device and the configuration image stored in any external memory module that is coupled to the IC device. This ensures that the system is disabled and any sensitive data stored within the system is erased once unauthorized access is detected. An external controller is not required as the IC device is able to execute a self-erase operation when a tamper condition is detected.

One of the embodiments describes a method for improving security of the IC by detecting a tamper condition. For example, if the IC detects an attempt to use or read data stored within the device, a self-erase sequence is activated. In one of the embodiments, the self-erase operation erases configuration data stored in the control random access memory (CRAM) module and any external memory module that is coupled to the IC so that when the device is powered up again, the device will be inoperable. The self-erase mechanism is useful in secured applications such as military, banking and securities systems, among others. The self-erase mechanism can ensure that any sensitive data stored within the device is completely erased if the device is tampered with in any way. It is appreciated that erasing sensitive data may be partial erasure, complete erasure, or any combination thereof as long as the erasure renders the device inoperable.

Figure 1:
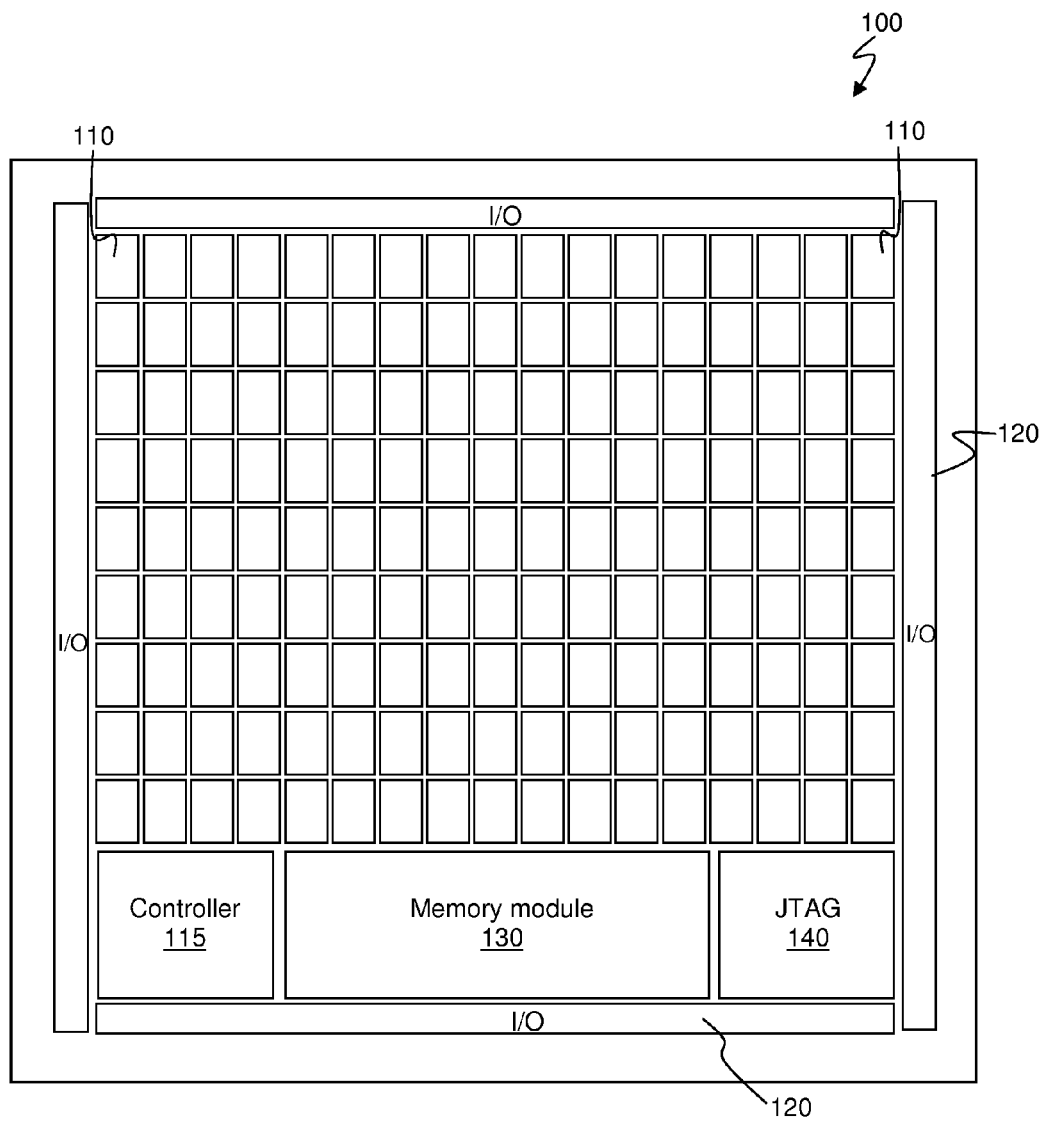
FIG. 1, meant to be illustrative and not limiting, shows a simplified block diagram of a programmable device that can include aspects of the present embodiments.

FIG. 1, meant to be illustrative and not limiting, shows a simplified block diagram of programmable device 100 that can include aspects of the present embodiments. Programmable device 100 includes embedded logic array blocks (LABs) 110. Each LABs 110 may include a plurality of logic elements (LEs). An LE is a small unit of logic to implement logic functions and each of the LABs 110 is therefore capable of performing specific logic functions. It is appreciated that multiple LABs 110 can be connected to form a user logic block that performs a variety of user specific functions. LABs 110 are interconnected by multiple horizontal and vertical conductors that provide signal interconnects between LABs 110. It is appreciated that any number of logic array blocks may be used even though only a few are shown in FIG. 1. LABs 110 are grouped into a grid array across programmable device 100 with input/output (I/O) elements 120 located at the ends of the arrays of LABs 110. I/O pins or I/O elements 120, located around the periphery of programmable device 100, may support a variety of differential and single-ended I/O standards.

Referring still to FIG. 1, programmable device 100 may also include a core fabric with core logic blocks. It is appreciated that the core fabric includes, among others, LEs having Look-up Tables (LUTs), memory blocks, e.g., memory module 130, multipliers and hard intellectual property (IP) blocks. It is appreciated that IP blocks, frequently referred to as IP cores, are logic blocks that include proprietary configuration data for various commonly-used functions, e.g., digital signal processors, NAND flash memory controllers, etc. Configuration controller block 115, placed at the bottom of the array of LABs 110 in the embodiment of FIG. 1, controls dedicated pins that are used for configuring programmable device 100 during a configuration operation. Memory module 130, also referred to as a memory block, is placed next to configuration controller block 115. Memory module 130 may be a non-volatile or non-power dependent memory module, in one embodiment. In another embodiment, memory module 130 is a CRAM module that is used to store configuration data within programmable device 100. LABs 110 and I/O elements 120 are configured with the configuration data stored in CRAM module 130 at power-up. Joint Test Action Group (JTAG) control circuitry 140 is a boundary-scan test (BST) circuit that in one embodiment complies with IEEE 1149.1-2001. In one embodiment, the JTAG interface is used to configure programmable device 100. In another embodiment, programmable device 100 has a real-time in-system programming (ISP) capability that allows programmable device 100 to be updated without disrupting the operation of programmable device 100. In one such embodiment, the real-time ISP allows memory block 130 to be updated with a different design configuration while the current design configuration continues to control programmable device 100. It is appreciated that the updated memory block 130 may configure programmable device 100 upon the next power-up cycle.

Figure 2:
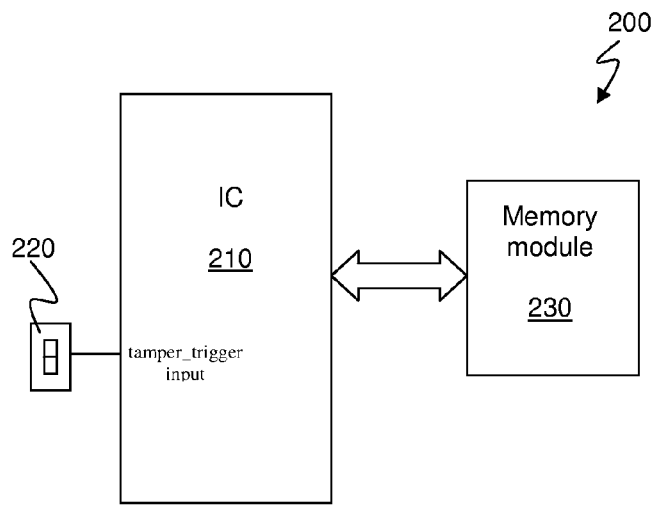
FIG. 2, meant to be illustrative and not limiting, shows a device with tamper-detect circuitry as one embodiment.

FIG. 2, meant to be illustrative and not limiting, shows device 200 with tamper-detect circuitry 220 as one embodiment. In one embodiment, IC 210 is similar to programmable device 100 of FIG. 1. IC 210 is coupled to an external memory module 230. In an exemplary embodiment, memory module 230 is a non-volatile memory (NVM) module, e.g., Common Flash memory Interface (CFI) flash, Electrically Erasable Programmable Read-Only Memory (EEPROM), Serial Peripheral Interface (SPI) flash, etc. Memory module 230 stores configuration data that is used to configure IC 210. Upon power up, IC 210 reads the configuration data from memory module 230 and an internal memory module on IC 210 stores the configuration data read from memory module 230. Once IC 210 is configured, IC 210 enters a user mode of operation to perform user logic functions. In the embodiment of FIG. 1, memory module 130 may be loaded with configuration data from an external memory module similar to memory module 230 of FIG. 2.

Referring still to FIG. 2, tamper-detect circuitry 220 is connected to an input on IC 210. Tamper-detect circuitry 220 is a circuit that is used to detect unauthorized or unwanted access to IC 210 in one embodiment. IC 210 is able to execute a self-erase operation in response to a tamper condition being detected to ensure that sensitive data stored within device 200 is not accessible to unauthorized parties. In an exemplary embodiment, tamper-detect circuitry 220 sends a trigger signal to IC 210 when an unauthorized attempt to access the IC is detected. For example, device 200 may be encased in a case and tamper-detect circuitry 220 will send out a trigger signal when an attempt to open the case is detected. In an alternative embodiment, IC 210 may be placed on a printed circuit board (PCB) and tamper-detect circuitry 220 is connected to detect any interruption in the device or the PCB. For example, any attempt to drill through the PCB would trigger tamper-detect circuitry 220 to send out a trigger signal to IC 210. It is appreciated that the trigger signal is a signal used to "stimulate" IC 210 to carry out a security response and start the erase operation. As such, in one embodiment, the trigger signal may be a logic high level that is sent to a specific input of IC 210. The trigger signal is used to start a self-erase operation that erases the configuration data stored in IC 210 and external memory module 230 as explained in further detail below.

Figure 3A:
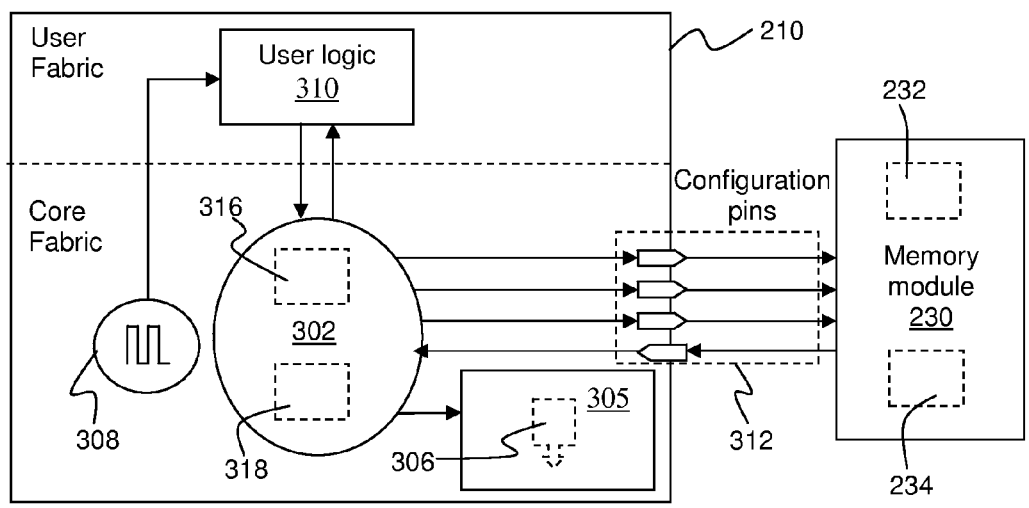
FIG. 3A, meant to be illustrative and not limiting, shows a more detailed representation of the integrated circuit (IC) of FIG. 2 as an exemplary embodiment.

FIG. 3A, meant to be illustrative and not limiting, shows a more detailed representation of IC 210 as an exemplary embodiment. The embodiment of FIG. 3A shows IC 210 with user logic block 310 coupled to core logic block 302 and clock source 308. IC 210 is coupled to memory module 230 through configuration pins 312. Memory module 230 may contain encrypted configuration image 232 and unencrypted configuration image 234. In the embodiment of FIG. 3A encrypted configuration image 232 is loaded to IC 210 through configuration pins 312 during power up. Configuration pins 312 are coupled to core logic block 302. In the embodiment of FIG. 3A, core logic block 302 includes JTAG interface block 316 and configuration pin interface block 318 that are coupled to user logic block 310 and configuration pins 312, respectively. Configuration pin interface block 318 is operationally similar to that of configuration controller block 115 of FIG. 1, according to one embodiment. Core logic block 302 of FIG. 3A is also coupled to storage block 305. In one embodiment, storage block 305 stores a security key 306 that is associated with encrypted configuration image 232 that is transferred to IC 210. An internal clock source 308 is coupled to user logic block 310 and instructions that are executed from user logic block 310 and core logic block 302 are clocked by internal clock source 308.

Figure 3B:
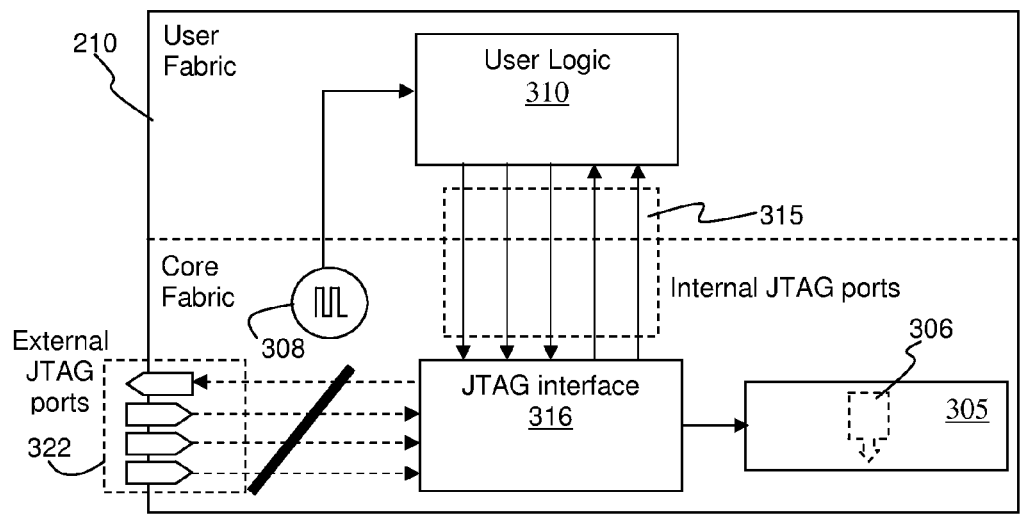
FIG. 3B, meant to be illustrative and not limiting, shows further details of a Joint Test Action Group (JTAG) interface block with a user logic block and a storage block in the IC as another exemplary embodiment.

FIG. 3B, meant to be illustrative and not limiting, shows the connection between JTAG interface block 316 in core logic block 302 of FIG. 3A with user logic block 310 and storage block 305 as another exemplary embodiment. User logic block 310 is directly connected to JTAG interface block 316 through internal JTAG ports 315. When a tamper-detect signal is received by IC 210, user logic block 310 passes control to JTAG interface block 316 through internal JTAG ports 315 to erase security key 306 that is associated with the configuration of IC 210. In an exemplary embodiment, security key 306 is erased with a clear signal that is routed internally in IC 210. Accordingly, in the embodiment of FIG. 3B, the security key erase is accomplished through JTAG interface block 316. It should be appreciated that external JTAG ports 322 on IC 210 are disabled when JTAG interface block 316 is accessed internally through IC 210. Consequently, any external attempts to communicate with IC 210 directly through JTAG interface 316, are blocked due to the triggering of the internal access. It should be appreciated that this ensures that the content of memory block 230 is not accessible externally through JTAG interface 316 before the completion of the erase operation.

Figure 3C:
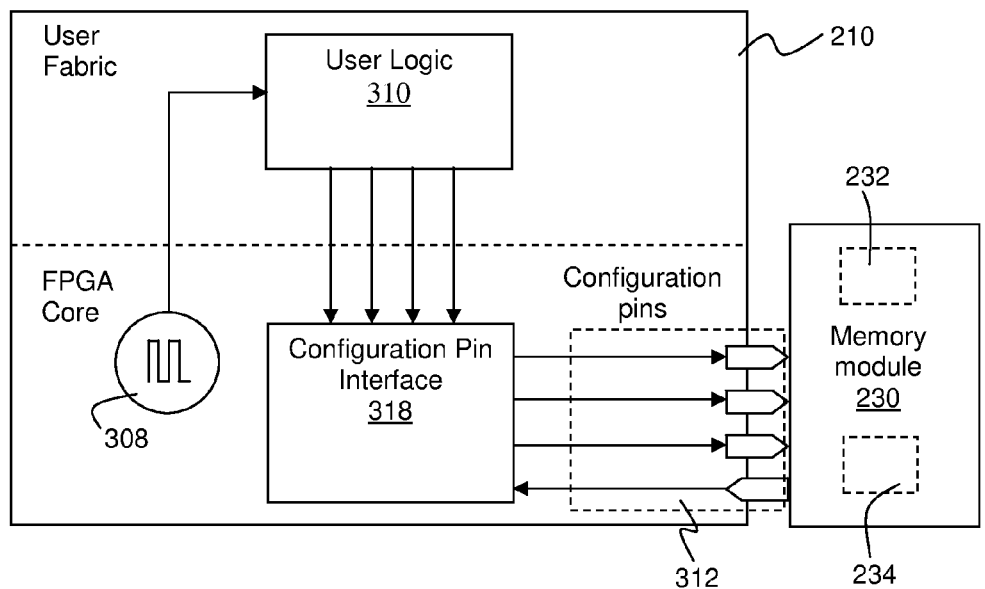
FIG. 3C, meant to be illustrative and not limiting, shows further details of a configuration pin interface block and configuration pins of the IC as yet another exemplary embodiment.

FIG. 3C, meant to be illustrative and not limiting, shows the connection between configuration pin interface block 318 in core logic block 302 of FIG. 3A with configuration pins 312 as yet another exemplary embodiment. In the embodiment of FIG. 3C, IC 210 is set up with an active configuration scheme and configuration pins 312 are dedicated pins that are used for configuring IC 210 during a configuration operation. It is appreciated that under active configuration schemes, the IC device 210 controls the configuration process and reads encrypted configuration data 232 from an external memory device 230 without relying on an external controller. In an exemplary embodiment, when IC 210 is placed in an active configuration scheme, dedicated configuration pins 312 can be accessed by user logic block 310 through configuration pin interface 318. When IC 210 receives a tamper-detect signal from tamper-detect circuitry, user logic block 310 can be used to access memory module 230 to erase encrypted configuration image 232 stored in memory module 230. In an exemplary embodiment, IC 210 is loaded with unencrypted configuration image 234 before the encrypted configuration image 232 is erased from memory module 230. Unencrypted configuration image 234 is a configuration file that contains a bit string of zeros or other logical values that renders IC 210 inoperable, according to one embodiment.

Figure 4:
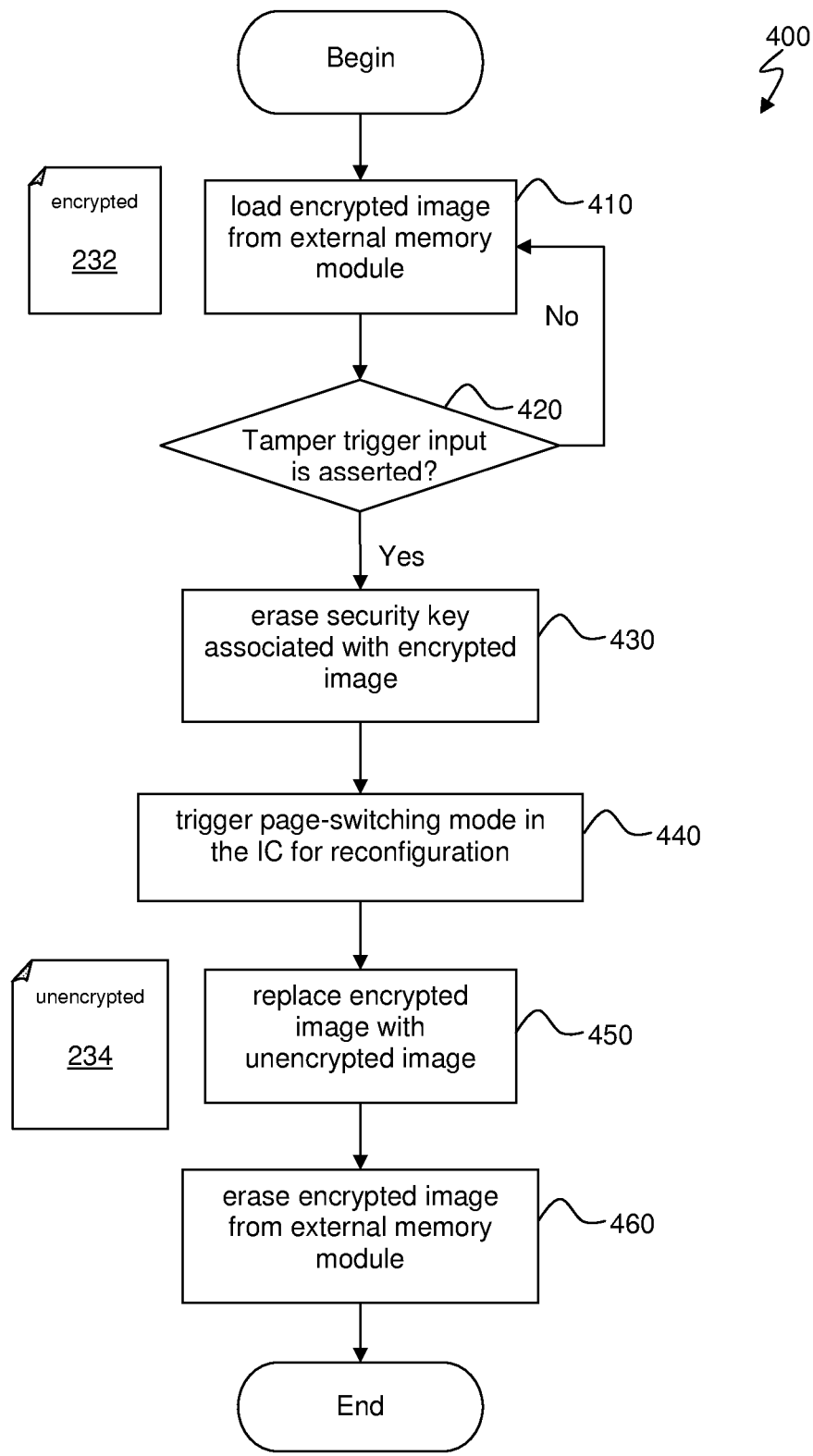
FIG. 4, meant to be illustrative and not limiting, shows a simplified method flow for improving security of an IC as another embodiment.

FIG. 4, meant to be illustrative and not limiting, shows simplified method flow 400 for improving security of an IC as another embodiment. Method flow 400 begins by loading sensitive image or encrypted configuration image 232 onto the IC from an external memory module in operation 410. A tamper condition is detected in the IC in operation 420 if the tamper trigger input on the IC is asserted. In one embodiment, the tamper condition is detected through a circuit coupled to the IC. The circuit may be similar to tamper-detect circuitry 220 of embodiment FIG. 2. Once the tamper condition is detected, the IC erases the security key that is associated with encrypted configuration image 232 through the internal JTAG interface in operation 430.

Continuing from FIG. 4, a page-switching mode is triggered in the IC for reconfiguration in operation 440. It is appreciated that when the page-switching mode is enabled, the IC is operable to load a different configuration image as needed. In an exemplary embodiment, the page-switching mode is the IC's capability to load or "switch" from one configuration image to another. In this embodiment, the page-switching mode allows the IC to replace encrypted image 232 with unencrypted image 234 in response to detecting a tamper condition. In the embodiment of FIG. 3A, external memory module 230 contains an encrypted configuration image 232 and an unencrypted configuration image 234. Unencrypted image 234 is loaded from the external memory module to the IC in operation 450. Encrypted configuration image 232 that was originally loaded onto the IC in operation 410 is replaced with unencrypted image 234 in operation 450. In an exemplary embodiment, unencrypted image 234 replaces encrypted image 232 in the static random access memory (SRAM) on the IC with all zeros. In another exemplary embodiment, unencrypted image 234 contains an unusable design. Encrypted configuration image 232 is erased from the external memory module in operation 460.

Figure 5:
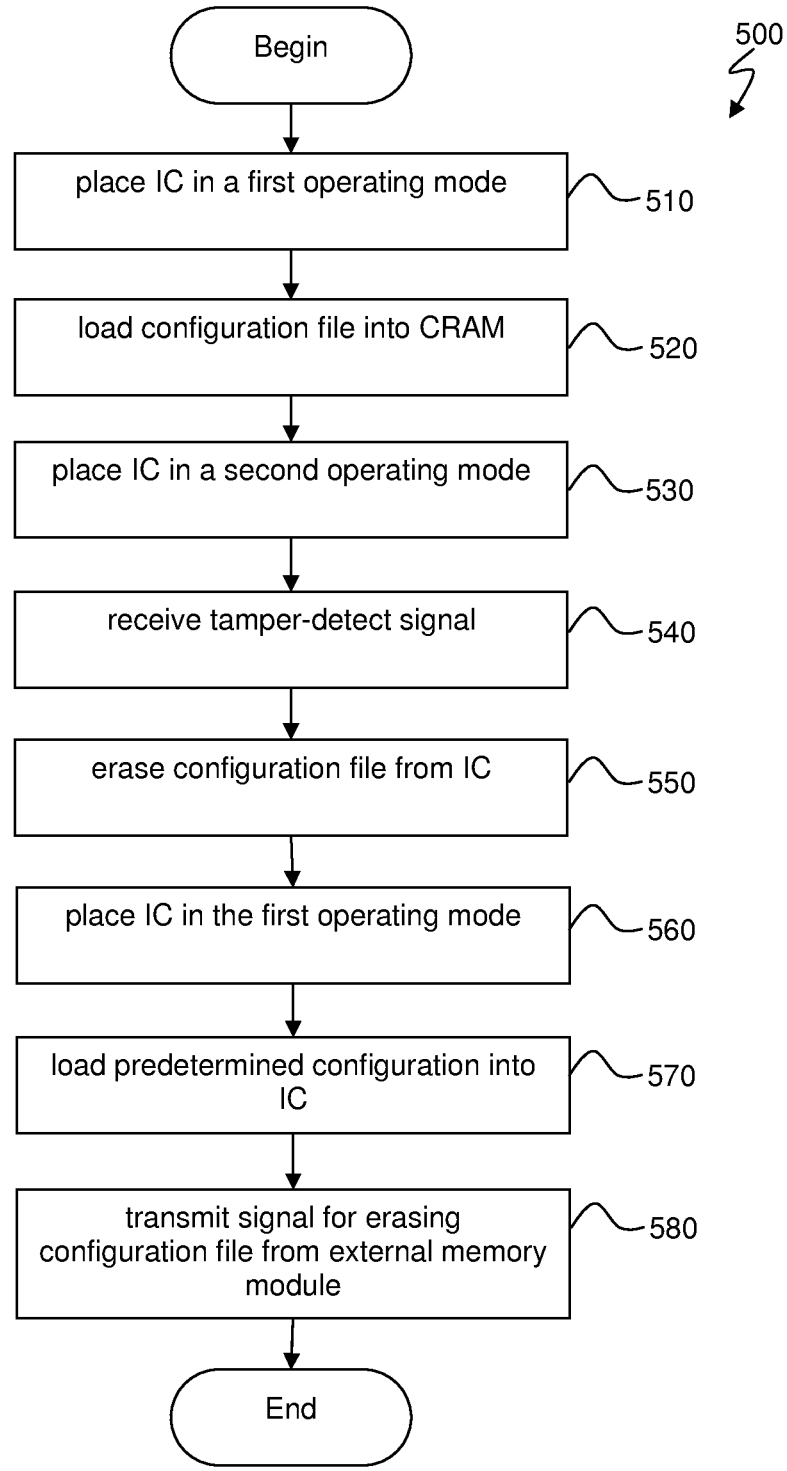
FIG. 5, meant to be illustrative and not limiting, shows a method flow for operating an IC as yet another embodiment.

FIG. 5, meant to be illustrative and not limiting, shows method flow 500 for operating an IC as yet another embodiment. Method flow 500 begins with placing the IC in a first operating mode in operation 510. In one embodiment, the first operating mode is a configuration mode. A configuration file is loaded into the CRAM of the IC in operation 520. In an exemplary embodiment, the IC is similar to IC 100 of FIG. 1 and the configuration file is loaded into CRAM 130. The IC is placed in a second operating mode in operation 530 once the configuration file has been loaded. According to one embodiment, the second operating mode is a user mode that allows the IC to perform user functions. A tamper-detect signal is received by the IC in operation 540. In the embodiment of FIG. 2, the IC is similar to IC 210 that is coupled to tamper-detect circuitry 220. The configuration file is erased from the CRAM of the IC in operation 550 when the tamper-detect signal is received. The IC is placed back in the first operating mode in operation 560 and a predetermined configuration is loaded into the IC in operation 570. In an exemplary embodiment, the configuration file that is loaded into the CRAM of the IC in operation 520 is an encrypted configuration image that contains sensitive configuration data and the predetermined configuration that is loaded into the IC in operation 570 contains an unusable design that renders the IC inoperable, such as the unencrypted configuration file mentioned above. A signal for erasing the encrypted configuration file from an external memory module that is coupled to the IC is transmitted in operation 580. In one embodiment, the predetermined configuration is capable of enabling the IC to have functionality for transmitting the erase signal to erase the encrypted configuration file that is stored in the external memory module. In another embodiment, the transmitted signal in operation 580 is clocked by an internal clock source on the IC.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of improving security of an integrated circuit (IC), the method comprising:
    detecting a tamper condition;
    erasing a digital key stored in the IC, wherein the digital key is associated with a first configuration data loaded onto the IC from a first memory, wherein the first memory is external to the IC; and
    loading a second configuration data from the first memory into a second memory in response to detecting the tamper condition, wherein the second memory is external to the first memory and internal to the IC, and
    erasing the first configuration data from the first memory, wherein the loading of the second configuration data occurs prior to the erasing the first configuration data from the first memory, wherein the second configuration data configures the IC to transmit an erase signal to erase the first configuration data stored in the first memory, and wherein each method operation is controlled by internal circuitry within the IC.

2. The method of claim 1 further comprising:
    transitioning to a reconfiguration mode prior to the loading of the second configuration data.

3. The method of claim 1, wherein the first configuration data is an encrypted configuration bitstream, and wherein the second configuration data is an unencrypted configuration bitstream.

4. The method of claim 1, wherein the loading of the second configuration data replaces the first configuration data, wherein the first configuration data is configuration data destined for a static random access memory (SRAM) module in the IC.

5. The method of claim 1, further comprising:
    disabling a scan chain interface in the IC based on the tamper condition.

6. The method of claim 1, further comprising:
    verifying the erasing of the digital key through a scan chain interface on the IC.

7. A method of operating an integrated circuit (IC), the method comprising:
    loading a configuration file into a control random access memory (CRAM) on the IC in a first operating mode, wherein the configuration file is loaded from an external memory module coupled to the IC;
    in a second operating mode, receiving a tamper-detect signal;
    placing the IC in the first operating mode;
    loading a predetermined configuration from the external memory module onto the CRAM in response to the receiving, wherein the predetermined configuration replaces the configuration file in the CRAM; and
    transmitting a signal for erasing the configuration file from the external memory module, wherein the predetermined configuration configures the IC to perform the transmitting the signal for erasing the configuration file from the external memory module.

8. The method of claim 7, wherein the configuration file stored in the external memory module is an encrypted file and wherein the predetermined configuration is an unencrypted file.

9. The method of claim 7 further comprising:
    erasing a security key that enables access to the configuration file from the IC prior to the loading the predetermined configuration.

10. The method of claim 7, wherein the loading the predetermined configuration onto the CRAM and transmitting the signal are controlled by a core logic block on the IC.

11. The method of claim 7 further comprising:
    disabling external access to a scan chain interface of the IC prior to the erasing of the configuration file from the CRAM.

12. The method of claim 7 further comprising:
    clocking the loading the predetermined configuration and the transmitting the signal for erasing the configuration file from the external memory module with an internal clock source of the IC.

13. The method of claim 7, wherein the first operating mode is a configuration mode, and wherein the second operating mode is a user mode.

14. An integrated circuit (IC), comprising:
   a memory module, wherein the memory module stores a configuration image and an associated security key, wherein the configuration image is loaded into the memory module from an external memory module coupled to the IC;
   a user logic block coupled to receive a tamper signal;
   a core logic block coupled to the user logic block and the memory module, wherein the core logic block transmits configuration instructions through a scan chain interface to overwrite the configuration image with a further configuration image from the external memory module and erase the associated security key from the memory module in response to the tamper signal, wherein the further configuration image configures the IC to transmit an erase signal to erase the configuration image stored in the external memory module; and
   a clock source that clocks the configuration instructions sent from the core logic block.

15. The IC of claim 14 further comprising:
   a tamper detector circuit coupled to the IC, wherein the tamper detector circuit detects unauthorized access to the IC.

16. The IC of claim 14, wherein the configuration image is stored in the external memory module, and wherein the configuration image stored in the external memory module configures the IC upon power up.

17. The IC of claim 16, wherein the external memory module is a non-volatile memory module.

18. The IC of claim 14, wherein the memory module is a control random access memory (CRAM) module and wherein the IC is a programmable logic device.

19. A device, comprising:
   tamper-detect circuitry that identifies unauthorized access to a system;
   an integrated circuit (IC) coupled to the tamper-detect circuitry;
   a configuration memory module on the IC that stores a configuration image;
   a scan chain interface module coupled to the configuration memory module, wherein the scan chain interface module sends configuration instructions to overwrite the configuration image stored in the configuration memory module with a further configuration image from a non-volatile memory module external to the IC, based on signals from the tamper-detect circuitry; and
   the non-volatile memory module coupled to the IC, the non-volatile memory module having a copy of the configuration image, wherein the further configuration image configures the IC to transmit an erase signal to erase the copy of the configuration image stored in the non-volatile memory module.

20. The device of claim 19, wherein the IC includes an internal clock source that clocks the configuration instructions.

21. The device of claim 19, wherein the configuration memory module includes a security key associated with the configuration image, and wherein the configuration image is an encrypted image.

22. The device of claim 19, wherein the further configuration image is an unencrypted image.

\* \* \* \* \*